US008563167B2

(12) United States Patent
Takeshita et al.

(10) Patent No.: US 8,563,167 B2
(45) Date of Patent: Oct. 22, 2013

(54) BATTERY DEVICE AND ELECTRONIC APPARATUS

(75) Inventors: Toshio Takeshita, Kanagawa (JP); Yoichi Miyajima, Tokyo (JP)

(73) Assignee: Sony Corporation, Tokyo (JP)

( * ) Notice: Subject to any disclaimer, the term of this patent is extended or adjusted under 35 U.S.C. 154(b) by 245 days.

(21) Appl. No.: 12/894,566

(22) Filed: Sep. 30, 2010

(65) Prior Publication Data

US 2011/0020698 A1 Jan. 27, 2011

Related U.S. Application Data

(63) Continuation of application No. 10/562,453, filed as application No. PCT/JP2004/019779 on Dec. 24, 2004, now Pat. No. 7,824,799.

(30) Foreign Application Priority Data

Dec. 26, 2003 (JP) ................................. 2003-432909

(51) Int. Cl.
*H01M 2/20* (2006.01)
*H01M 2/10* (2006.01)
*H01M 2/02* (2006.01)

(52) U.S. Cl.
USPC ............... 429/179; 429/99; 429/96; 429/100; 429/178

(58) Field of Classification Search
None
See application file for complete search history.

(56) References Cited

U.S. PATENT DOCUMENTS

| 5,415,947 | A | | 5/1995 | Mitsui et al. |
| 5,437,938 | A | | 8/1995 | Mitsui et al. |
| 5,602,454 | A | | 2/1997 | Arakawa et al. |
| 5,626,979 | A | * | 5/1997 | Mitsui et al. ................... 429/97 |
| 5,672,441 | A | | 9/1997 | Aoki et al. |
| 5,805,069 | A | | 9/1998 | Mitsui et al. |
| 5,999,102 | A | | 12/1999 | Mitsui et al. |
| 6,057,608 | A | | 5/2000 | Bailey, Jr. et al. |
| 6,127,063 | A | | 10/2000 | Kowalsky et al. |

(Continued)

FOREIGN PATENT DOCUMENTS

| EP | 1 030 385 A1 | 8/2000 |
| EP | 1 061 593 A2 | 12/2000 |

(Continued)

OTHER PUBLICATIONS

U.S. Appl. No. 12/845,443, filed Jul. 28, 2010, Takeshita, et al.

(Continued)

*Primary Examiner* — Barbara Gilliam
*Assistant Examiner* — Angela Martin
(74) *Attorney, Agent, or Firm* — Oblon, Spivak, McClelland, Maier & Neustadt, L.L.P.

(57) ABSTRACT

A battery apparatus including a case, a battery cell, a battery-side terminal, and an engaging piece. The case has a width, a thickness, and a length. The battery cell is housed in an inside of the case. The battery-side terminal is disposed on a side surface at one end of the case in a length direction and electrically connected to the battery cell. The engaging piece is disposed at the one end of the case at which the battery-side terminal is positioned such that the engaging piece extends in a length direction a same distance as the case at the one end portion. The engaging piece is at an edge of the case in a width direction.

6 Claims, 11 Drawing Sheets

(56) References Cited

U.S. PATENT DOCUMENTS

| | | | |
|---|---|---|---|
| 6,171,126 | B1 | 1/2001 | Wu et al. |
| 6,261,715 | B1 | 7/2001 | Nakamura et al. |
| 6,326,766 | B1 | 12/2001 | Small |
| 6,521,370 | B1 * | 2/2003 | Takeshita et al. ............... 429/96 |
| 6,577,101 | B1 | 6/2003 | Takeshita et al. |
| 6,646,414 | B2 * | 11/2003 | Small ........................... 320/106 |
| 6,729,413 | B2 | 5/2004 | Turner et al. |
| 6,749,960 | B2 | 6/2004 | Takeshita et al. |
| 7,086,894 | B2 * | 8/2006 | Ebine ........................... 439/500 |
| D535,253 | S | 1/2007 | Buck |
| 7,281,945 | B2 * | 10/2007 | Ebine et al. .................. 439/500 |
| 7,435,133 | B2 | 10/2008 | Ebine et al. |
| 7,485,394 | B2 | 2/2009 | Takeshita et al. |
| 7,556,526 | B2 | 7/2009 | Ebine et al. |
| 7,879,481 | B2 * | 2/2011 | Takeshita et al. ............... 429/99 |
| 2003/0027042 | A1 * | 2/2003 | Huang ........................... 429/176 |
| 2004/0058231 | A1 | 3/2004 | Takeshita et al. |
| 2004/0152365 | A1 * | 8/2004 | Ebine ........................... 439/701 |
| 2007/0042232 | A1 | 2/2007 | Takeshita et al. |
| 2008/0050648 | A1 | 2/2008 | Hara et al. |
| 2008/0050650 | A1 | 2/2008 | Hara et al. |

FOREIGN PATENT DOCUMENTS

| | | |
|---|---|---|
| EP | 1 061 593 A3 | 12/2000 |
| GB | 497231 | 12/1938 |
| JP | S55-93686 | 7/1980 |
| JP | H01-155654 | 10/1989 |
| JP | Hei 01-155654 * | 10/1989 |
| JP | H04-10957 | 1/1992 |
| JP | H07-335186 | 12/1995 |
| JP | H09-069360 | 3/1997 |
| JP | 2000-243361 | 9/2000 |
| JP | 2002-63879 | 2/2002 |
| JP | 2003-36828 | 2/2003 |
| JP | 2003-77443 | 3/2003 |
| JP | 2005-190903 | 7/2005 |
| WO | WO 03010840 | 2/2003 |
| WO | WO 03010840 A1 * | 2/2003 |
| WO | WO 03/026040 A1 | 3/2003 |

OTHER PUBLICATIONS

U.S. Appl. No. 12/845,437, filed Jul. 28, 2010, Takeshita, et al.
U.S. Appl. No. 08/022,562, filed Feb. 25, 1993, Mitsui, et al.

* cited by examiner

US 8,563,167 B2

BATTERY DEVICE AND ELECTRONIC APPARATUS

CROSS REFERENCE TO RELATED APPLICATIONS

This application is a continuation of U.S. application Ser. No. 10/562,453, filed on Jan. 13, 2006, and is based upon and claims the benefit of priority to International Application No. PCT/JP04/19779, filed on Dec. 24, 2004 and from the prior Japanese Patent Application No. 2003-432909 filed on Dec. 26, 2003. The entire contents of each of these documents are incorporated herein by reference.

TECHNICAL FIELD

The present invention relates to a battery apparatus and electronic equipment operable by the battery apparatus.

BACKGROUND ART

As a battery apparatus mountable on electronic equipment, there is provided one which is provided with a case having a width, a thickness and a length; a battery cell housed in the inside of the case, and a battery-side terminal disposed at a surface of the case and electrically connected to the battery cell, and which is arranged to be mounted while mating a bottom surface positioned at one side of the thickness direction of the case with a mounting surface of a battery mounting section of the electronic equipment and then sliding the case in the length direction of the case, so that the battery-side terminal makes connection with a mounting section-side terminal of the battery mounting section (see for example Japanese Patent No. 2508447).

Mounting of such a battery apparatus to the battery mounting section is achieved by the engagement between engaging portions, which are disposed at the case of the battery apparatus and at the battery mounting section, respectively.

However, in the above-mentioned battery apparatus and the electronic equipment, the engaging portions are disposed at two portions on both ends in the length direction of the case, and hence in order to securely hold the battery apparatus to the battery mounting section, it is necessary to set to a large value the dimension that the engaging portions are in contact with each other in the length direction of the case. This increases the moving stroke of the battery apparatus at the time of engaging and releasing the engaging portions, and introduces a disadvantage in improving operability.

Further, since the engaging portions of the battery apparatus are disposed only at the two portions on both ends in the length direction, there is a disadvantage in reliably mounting the battery apparatus to the battery mounting section.

Additionally, since the engaging portions are disposed at the two portions in the length direction of the case, and the battery-side terminal is disposed at the portion on one side of both ends in the length direction of the case, there is an inconvenience that the battery apparatus may be mounted incompletely on the battery mounting section. In other words, only the engaging portion nearer the battery-side terminal of the two engaging portions is engaged to the engaging portion of the battery mounting section side, and the engaging portion on the opposite side of the battery-side terminal is not engaged with the engaged portion of the battery mounting section side. As a result, there might cause a situation where the battery apparatus is inclined to the battery mounting section, and a situation where the battery-side terminal incompletely connects with the mounting section-side terminal to allow electrical continuity.

The present invention was accomplished in view of such circumstances, and an object of the present invention is to provide a battery apparatus and electronic equipment capable of reliably mounting the battery apparatus on a battery mounting section, and advantageous in improving operability when mounting the battery apparatus on the battery mounting section.

DISCLOSURE OF INVENTION

To achieve the above-mentioned object, a battery apparatus of the present invention is a battery apparatus which includes a case having a width, a thickness and a length; a battery cell housed in the inside of the case; and a battery-side terminal disposed at a surface of the case and electrically connected to the battery cell, and is mounted while mating a bottom surface positioned at one side in the thickness direction of the case with a mounting surface of a battery mounting section of electronic equipment and then sliding the case in the length direction of the case, so that the battery-side terminal makes connection with a mounting section-side terminal of the battery mounting section. The battery apparatus is characterized in that, at portions on both sides in the width direction of the case, three or more engaging pieces, which extend in the length direction while projecting outwardly in the width direction, and are engaged to engaging claws of the battery mounting section and position a position in the thickness direction of the case at the battery mounting section while mating the bottom surface of the case with the mounting surface and then sliding the case in the length direction of the case, are disposed at spaced intervals in the length direction.

In addition, electronic equipment of the present invention is electronic equipment having a battery mounting section on which a battery apparatus is removably mounted. The battery apparatus includes a case having a width, a thickness and a length; a battery cell housed in the inside of the case; a bottom surface positioned at one side in the thickness direction of the case; and a battery-side terminal disposed at a surface of the case and electrically connected to the battery cell. At portions on both sides in the width direction of the case of the battery apparatus, three or more engaging pieces extending in the length direction while projecting outwardly in the width direction are disposed at spaced intervals in the length direction. The battery mounting section includes a mounting section-side terminal to make contact with the battery-side terminal, and a mounting surface with which the bottom surface is mated. The mounting surface has a width of a dimension corresponding to the width of the case, and a length of a dimension greater than the length of the case. At portions on both sides in the width direction of the mounting surface on a mounting surface of the battery mounting section, engaging claws, which engage the engaging pieces and position a position in the thickness direction of the case on the mounting surface by matching the width direction and the length direction of the case with the width direction and the length direction of the mounting surface, and mating the bottom surface of the case with the mounting surface, and then sliding the case in the length direction of the case, are disposed in the number corresponding to that of the engaging pieces.

BEST MODE FOR CARRYING OUT THE INVENTION

Figure 1:
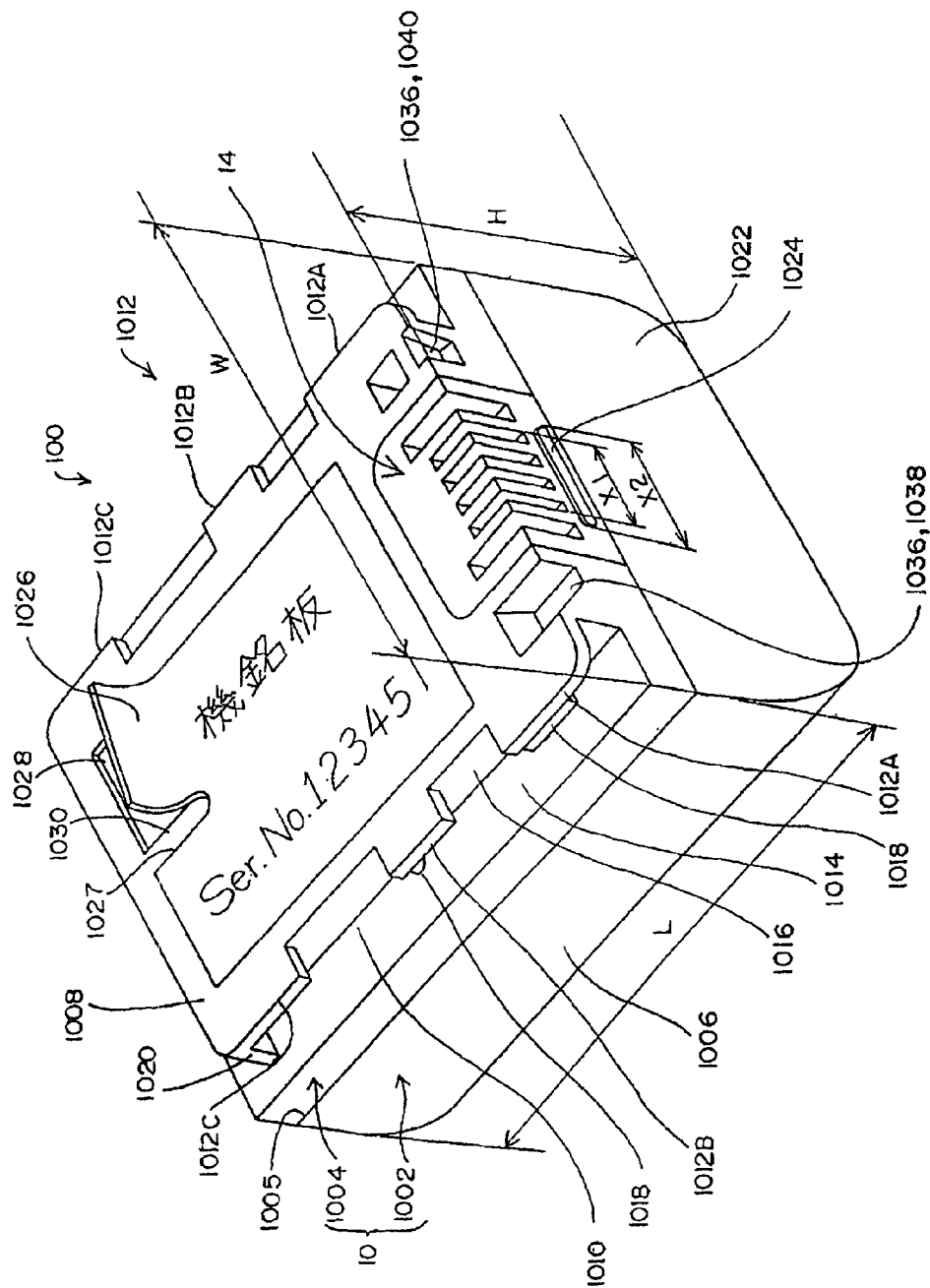
FIG. 1 is a perspective view taken from the bottom of a battery apparatus in a first embodiment of the present invention.

The object of improving operability when mounting a battery apparatus on a battery mounting section of electronic equipment is realized by disposing three or more engaging pieces at the battery apparatus and disposing engaging claws in the number corresponding to that of the engaging pieces at the battery mounting section.

First Embodiment

A first embodiment of the present invention will next be described by referring to the drawings.

In the present embodiment, a description will be made on a case where the battery apparatus of the present invention is mounted for use on an imaging apparatus as electronic equipment.

Figure 2:
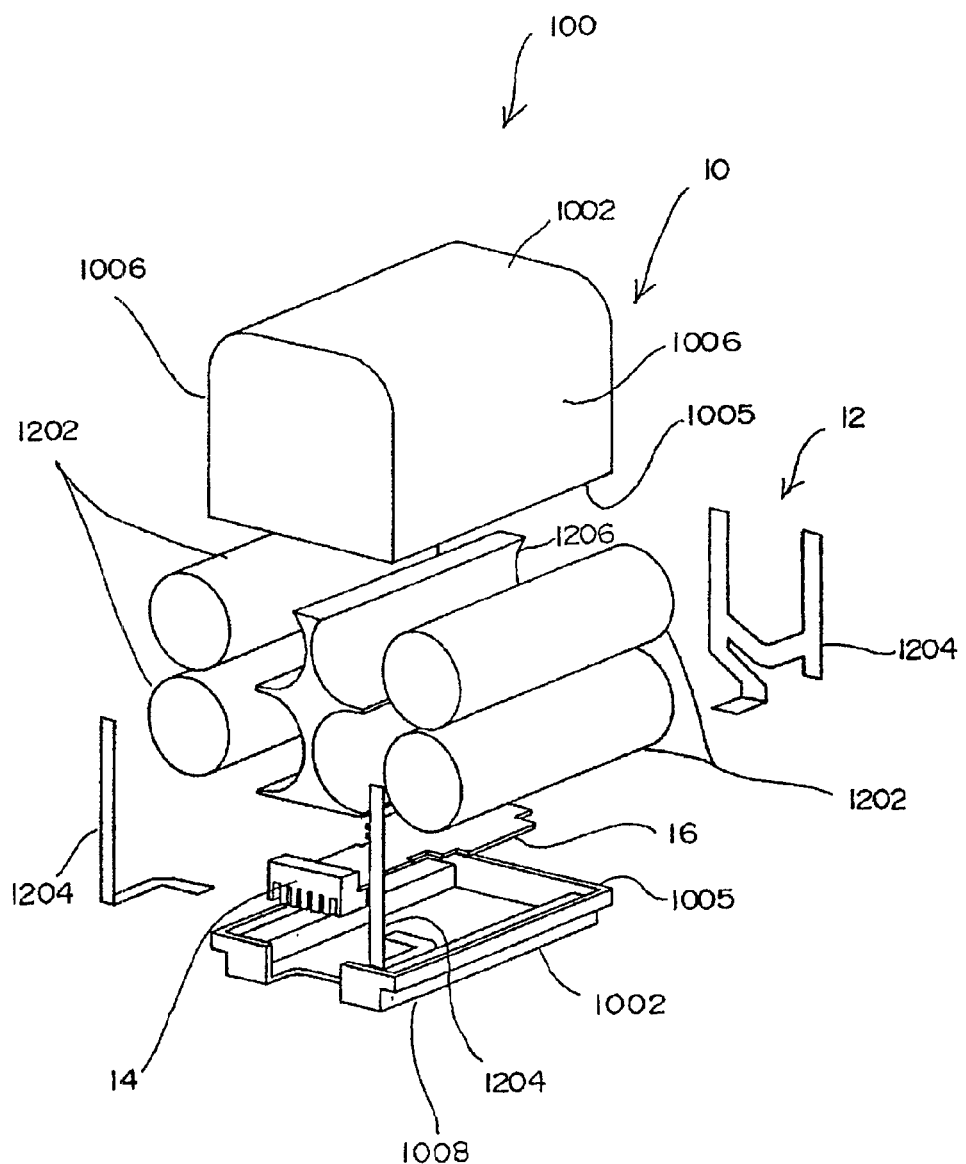
FIG. 2 is a disassembled perspective view illustrating the construction of the battery apparatus of the first embodiment.

FIG. 1 is a perspective view taken from the bottom of the battery apparatus of the first embodiment, and FIG. 2 is a disassembled perspective view illustrating a configuration of the battery apparatus of the first embodiment.

First, the battery apparatus will be described.

As shown in FIG. 1, a battery apparatus 100 has a case 10, a battery cell (chargeable battery section) 12 (see FIG. 2) housed in the inside of the case 10, a control circuit board 16 disposed inside the case 10, and a battery-side terminal 14 disposed at the case 10.

As shown in FIG. 2, the chargeable battery section 12 has four cylindrical battery cells 1202, a plurality of wiring members 1204 for connecting the electrodes of these respective battery cells 1202, and a holding member 1206 interposed between the side surfaces of the respective battery cells 1202.

The control circuit board 16 is connected via the wiring members 1204 to electrodes of the respective battery cells 1202 such that it is attached to the chargeable battery section 12. The control circuit board 16 has a microcomputer including a CPU, a RAM and a ROM, an interface, etc, and is configured to execute data communication with external electronic equipment via the battery-side terminal 14. The data communication includes an output operation of identification data indicating a capacity and a characteristic feature of the battery apparatus 100. Examples of the identification data are data indicating whether a quick charge is possible or not when the battery apparatus is mounted on a battery charger, and data indicating an appropriate charging current value or an upper limit value of the charging current.

The battery-side terminal 14 is disposed at a surface of the case 10, and in the inside of the case 10, it is attached to the control circuit board 16 to be made conductive to the electrodes of the battery cells 1202 via the respective wiring members 1204, so that there are performed, via the battery-side terminal 14, the supply of the operating current from the respective battery cells 1202 to the external electronic equipment, or the supply of charging current from the battery charger to the respective battery cells 1202.

It is noted that the number and the shape of the battery cells 1202 constituting the chargeable battery section 12, of course, vary according to the capacity and the characteristic of the battery apparatus 100.

Description will now be made in detail of the construction of the case 10.

Figure 5:
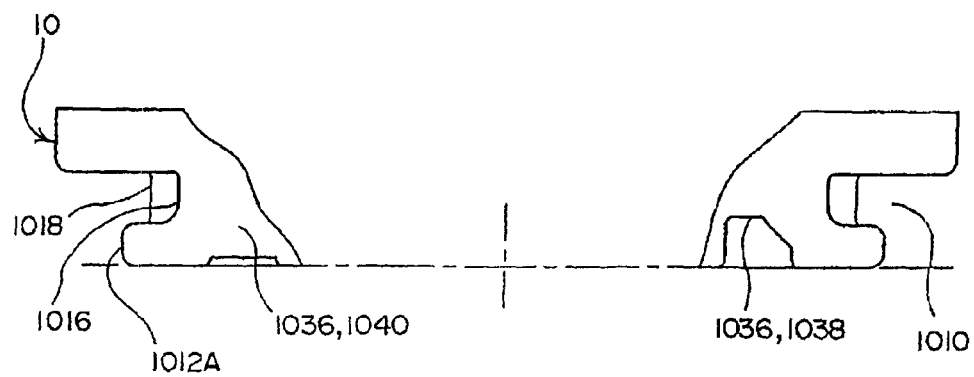
FIG. 5 is an enlarged view of an important part in FIG. 3.
Figure 6:
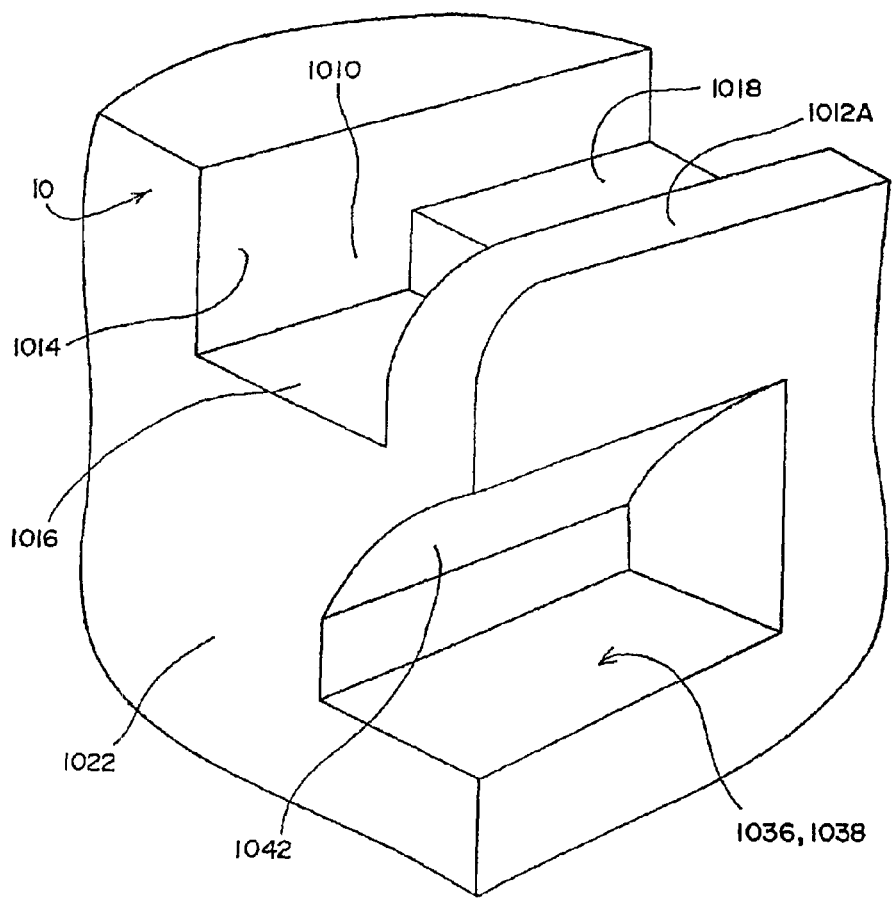
FIG. 6 is an enlarged perspective view of an identification section 1036 and its surroundings.

FIG. 3(A) is a plan view of the battery apparatus 100, FIG. 3(B) is a view taken in the direction of arrow B in FIG. 3(A), FIG. 3(C) is a view taken in the direction of arrow C in FIG. 3(A), FIG. 3(D) is a view taken in the direction of arrow D in FIG. 3(A), and FIG. 3(E) is a sectional view taken along the line E-E in FIG. 3(B). FIG. 4A is a bottom view of the battery apparatus 100, FIG. 4B is a view taken in the direction of arrow B in FIG. 4A, and FIG. 4C is a sectional view taken along the line C-C in FIG. 4B. FIG. 5 is an enlarged view of a portion indicated by F in FIG. 3(C). FIG. 6 is an enlarged perspective view of an identification section 1036 and its surroundings.

The case 10 has a main body portion 1002 that is uniform in the dimension in a width direction W and extends in a length direction L, and a bottom portion 1004 that is disposed at the midpoint in the width direction W of the main body portion 1002 on one side in a thickness direction H, and extends in the length direction L in an uniform width of a dimension smaller than the width of the main body portion 1002.

In the present embodiment, the case 10 includes a first segment excluding the portion nearer the bottom portion 1004 of the main body portion 1002 and the bottom portion 1004, and a second segment including the portion nearer the bottom portion 1004 of the main body portion 1002 and the bottom portion 1004. These segments are mated with a mating surface 1005 to form the case 10. The chargeable battery section 12 and the control circuit board 16 are housed in the inside of these segments.

Figure 3:
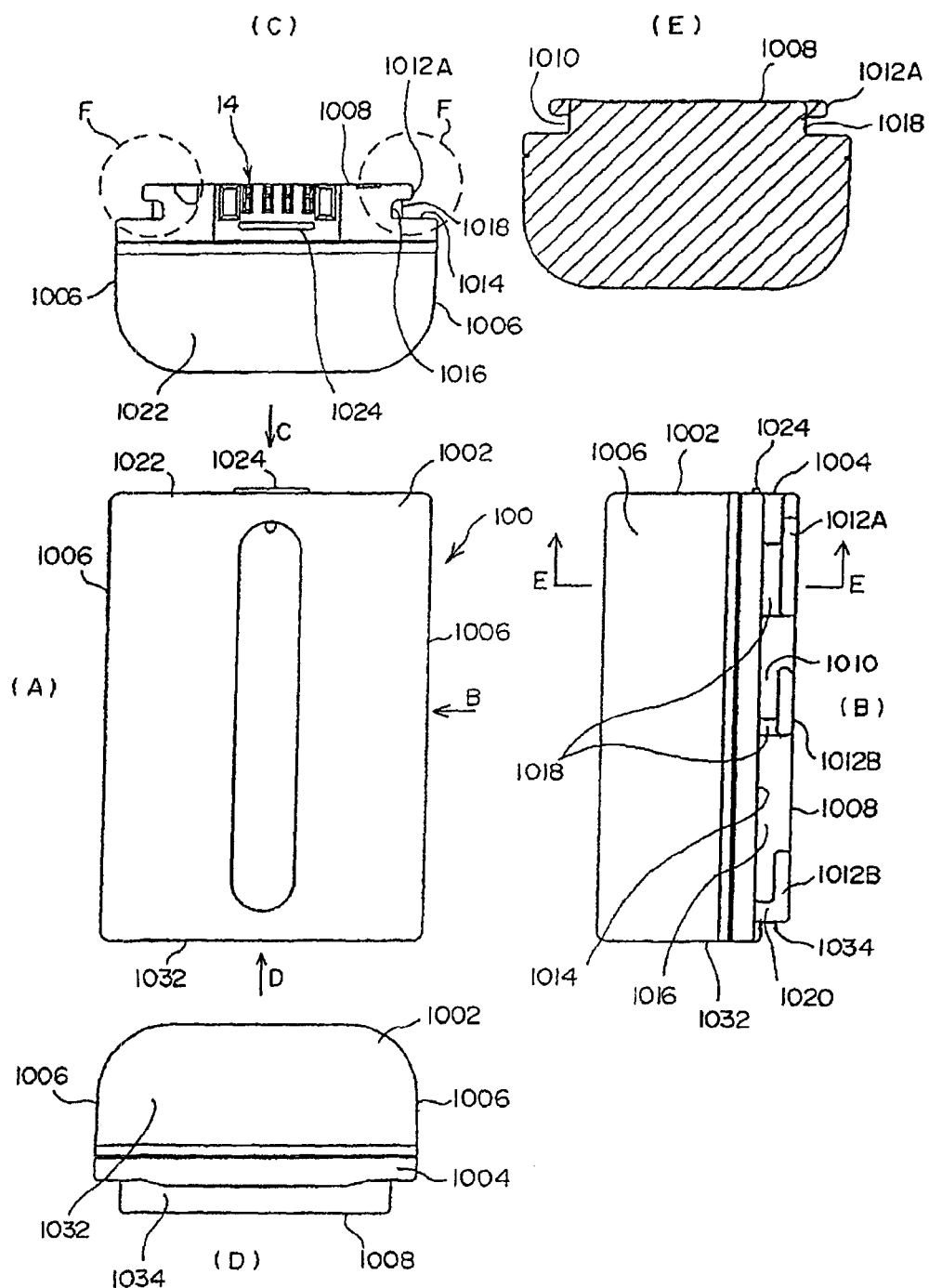
FIG. 3 is an explanatory view of a battery apparatus 100.
Figure 4A:
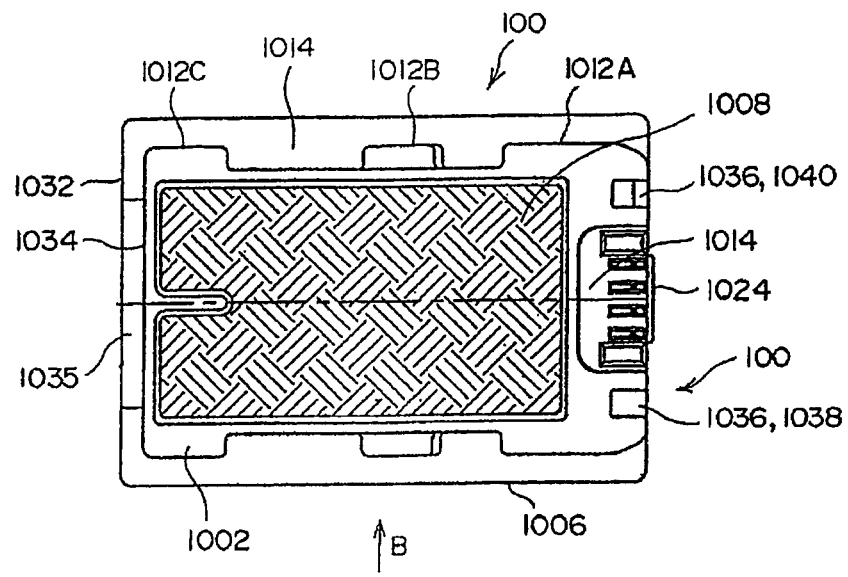
FIGS. 4A, B, C are explanatory view of the battery apparatus 100.
Figure 4B:
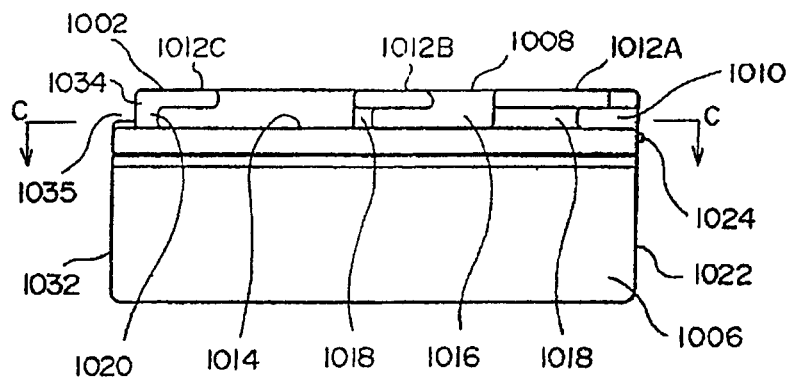
Figure 4C:
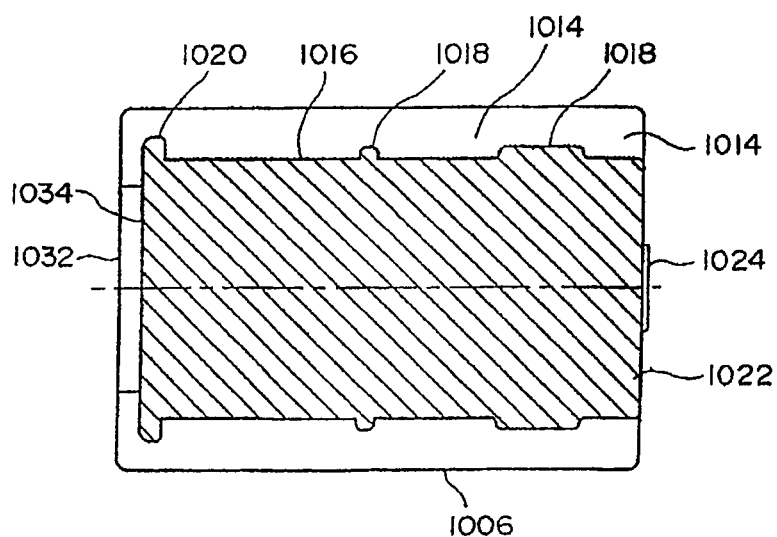

As shown in FIG. 2, FIG. 3 and FIGS. 4A, B and C, the portions on both sides in the width direction W of the case 10 are formed as flat side surfaces 1006 that are parallel to each other and extend in the length direction L. One plane in the thickness direction H of the case 10 is formed as a flat bottom surface 1008. In the present embodiment, the side surfaces on both sides in the width direction W of the main body portion 1002 constitute the side surfaces 1006, and the bottom surface of the bottom portion 1004 constitutes the bottom surface 1008.

At the portions of the bottom surface 1008 on the both sides in the width direction W, a plurality of engaging pieces 1012, which are three engaging pieces 1012A, 1012B and 1012C in the present embodiment, are formed so as to project outwardly in the width direction W at spaced intervals in the length direction L. The portions of the respective engaging pieces 1012 (1012A, 1012B and 1012C) positioned at one end portion in the thickness direction H are formed as a bottom surface flush with the bottom surface 1008. The portions of the respective engaging pieces 1012 (1012A, 1012B and 1012C) positioned at the other end portion in the thickness direction H are formed parallel to and arranged flush with the bottom surface 1008.

By disposing the three engaging pieces 1012 (1012A, 1012B and 1012C) in this manner, three recess portions 1010 extending in the length direction L are formed for each of the portions of the bottom surface 1008 on both sides in the width direction W, by using the respective engaging pieces 1012 (1012A, 1012B and 1012C), side surfaces 1016 of the bottom portion 1004 positioned on both sides in the width direction W, and a plane 1014 on which the main body portion 1002 faces the bottom portion 1004.

These engaging pieces 1012 (1012A, 1012B and 1012C) are arranged to engage the engaging claws of the battery mounting section and position the positions in the thickness direction H of the case 10 in the battery mounting section, while mating the bottom surface 1008 of the case 10 with the mounting surface of the battery mounting section of the electronic equipment and then sliding the case in the length direction L of the case 10.

The battery-side terminal 14 is disposed at a portion of the bottom surface 1008 on one end in the length direction L.

The two engaging pieces 1012A and 1012C of the three engaging pieces 1012 (1012A, 1012B and 1012C) are disposed at portions nearer the end portion in the length direction L of the case 10, and the remaining engaging piece 1012B is disposed at a portion close to the engaging piece 1012A disposed nearer the end portion of the case 10 at which the battery-side terminal 14 is positioned.

In the present embodiment, two convex portions 1018 projecting outwardly in the width direction W from the side surfaces 1016 are disposed at the portions of the side surfaces 1016 of the bottom portion 1004 which correspond to the two engaging pieces 1012A and 10128, respectively. The two convex portions 1018 are formed in a projected dimension smaller than the engaging pieces 1012A and 1012B.

One convex portion 1018 of the two convex portions 1018 provides connection among the engaging pieces 1012A, the plane 1014 on which the main body portion 1002 faces the bottom portion 1004, and the side surfaces 1016 of the bottom portion 1004 positioned at both sides in the width direction W, and the other convex portion 1018 provides connection among the engaging piece 1012B, the plane 1014, and the side surfaces 1016. Thereby, it is advantageous in improving the mechanical strength of the engaging pieces 1012A and 1012B with these two convex portions 1018.

In addition, a stopper wall 1020 for blocking the end portion in the length direction L of the recess portion 1010 is disposed at a portion on the opposite side of the portion that the battery-side terminal 14 is disposed at the portion of the side surface 1016 of the bottom portion 1004 which corresponds to the remaining one engaging piece 1012C. When mounting the battery apparatus 100 on the battery mounting section, if the direction in the length direction of the battery apparatus 100 is not a normal direction, the stopper wall 1020 abuts the engaging claw of the battery mounting section in order to prevent the battery apparatus 100 from being mounted in an erroneous direction.

Since the engaging piece 1012C, the plane 1014, and the side surfaces 1016 are connected to one another by the stopper wall 1020, it is advantageous in improving the mechanical strength of the engaging piece 1012C with the stopper wall 1020.

Further, in the present embodiment, as shown in FIG. 1, the end surfaces of the main body portion 1002 and the bottom portion 1004 on the side on which the battery-side terminal 14 is disposed, which is one of the end surfaces on both ends in the length direction L of the case 10, are formed as a flat end surface 1022 orthogonal to the bottom surface 1008. A convex portion 1024 that is uniform in the dimension in the thickness direction H, and extends linearly in the width direction W is formed so as to swell at a portion apart in the thickness direction H from the battery-side terminal 14 of the end surface 1022. The convex portion 1024 is formed at the portion corresponding to the battery-side terminal 14 and in a length X2 having a greater dimension than a length X1 of the portion at which at least the electrodes of the battery-side terminal 14 are disposed.

Additionally, as shown in FIG. 1, a recess portion 1028 is formed at the bottom surface 1008, and a specification plate 1026 is affixed to the recess portion 1028. The surface of the specification plate 1026 is flush with the bottom surface 1008, or the surface of the specification plate 1026 is arranged to position nearer the inside of the case 10 than the bottom surface 1008. A positioning convex portion 1030 arranged flush with the bottom surface 1008 is formed in the length direction L from the portion positioned on the opposite side of the battery-side terminal 14 in the length direction L of the recess portion 1028. The convex portion 1030 is inserted into a positioning groove 1027 of the specification plate 1026.

Moreover, as shown in FIGS. 4A and 4B, the end surface of the main body portion 1002 positioned on the opposite side of the battery-side terminal 14, which is one of the end surfaces of both ends in the length direction L of the case 10, is formed as a flat end surface 1032 orthogonal to the bottom surface 1008, and the end surface of the bottom portion 1004 positioned on the opposite side of the battery-side terminal 14 is formed as a flat end surface 1034 that is parallel to the end surface 1032, at a portion displaced toward the inside of the case 10 from the end surface 1032. Accordingly, the end surfaces 1032 and 1034 constitute a cutout portion 1035 at a boundary portion between the main body portion 1002 and the bottom portion 1004, which are at the end portion positioned on the opposite side of the battery-side terminal 14 in the length direction L of the case 10.

As shown in FIG. 1, FIG. 5 and FIG. 6, two identification sections 1036 are formed at portions on both sides of the bottom surface 1008 of the bottom portion 1004 which sandwich therebetween the battery-side terminal 14 in the width direction W. These identification sections 1036 are formed as recess portions 1038 that are opened in the thickness direction H and the length direction L, or as recess portions 1040 that are opened in the thickness direction H and blocked in the length direction L. The identification sections 1036 are identified by identification means disposed on the electronic equipment side, and this identification is based on the shape of the recess portions 1038 and 1040, and the dimension in the length direction L of the recess portions 1038.

A plane portion in the vicinity of the recess portion 1010 of planes constituting the recess portion 1038 is made to be an inclined surface 1042 so as to ensure a wall thickness dimension between the recess portion 1010 and the recess portion 1038, thereby ensuring the mechanical strength of the engaging piece 1012A.

An imaging apparatus 200 will next be described.

Figure 7:
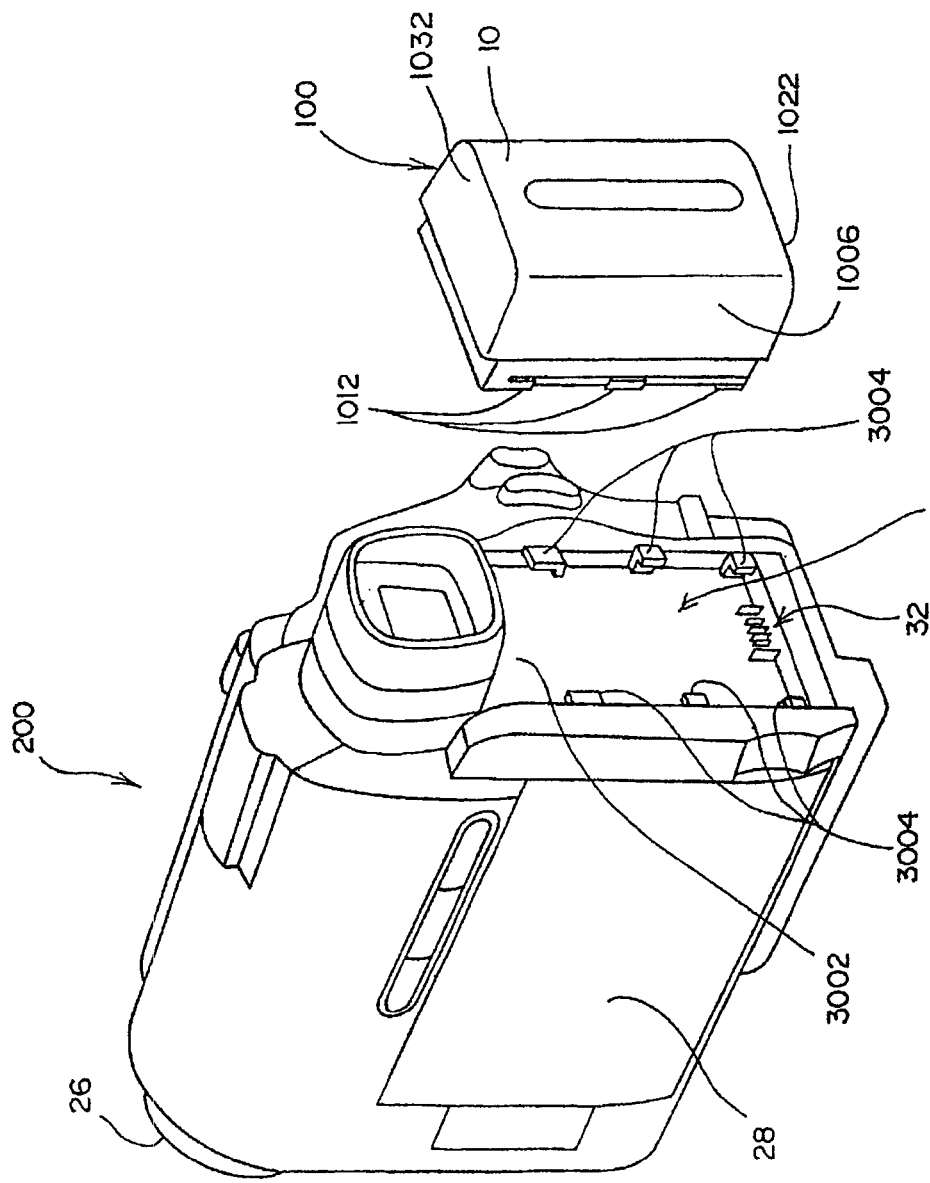
FIG. 7 is a perspective view of an imaging apparatus 200 to which the battery apparatus 100 is attached externally.
Figure 8:
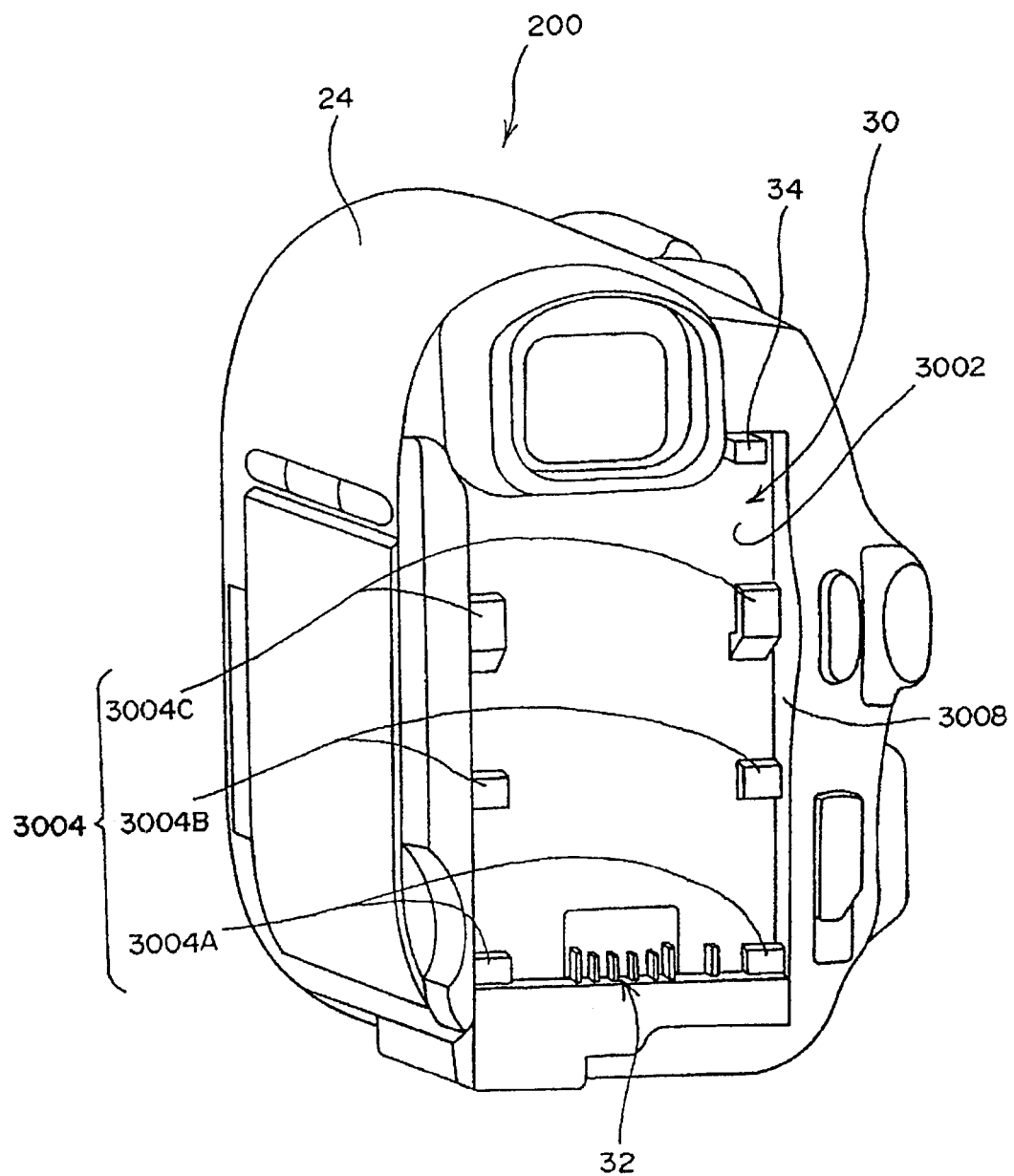
FIG. 8 is an enlarged view of a battery mounting section of the imaging apparatus 200.
Figure 9:
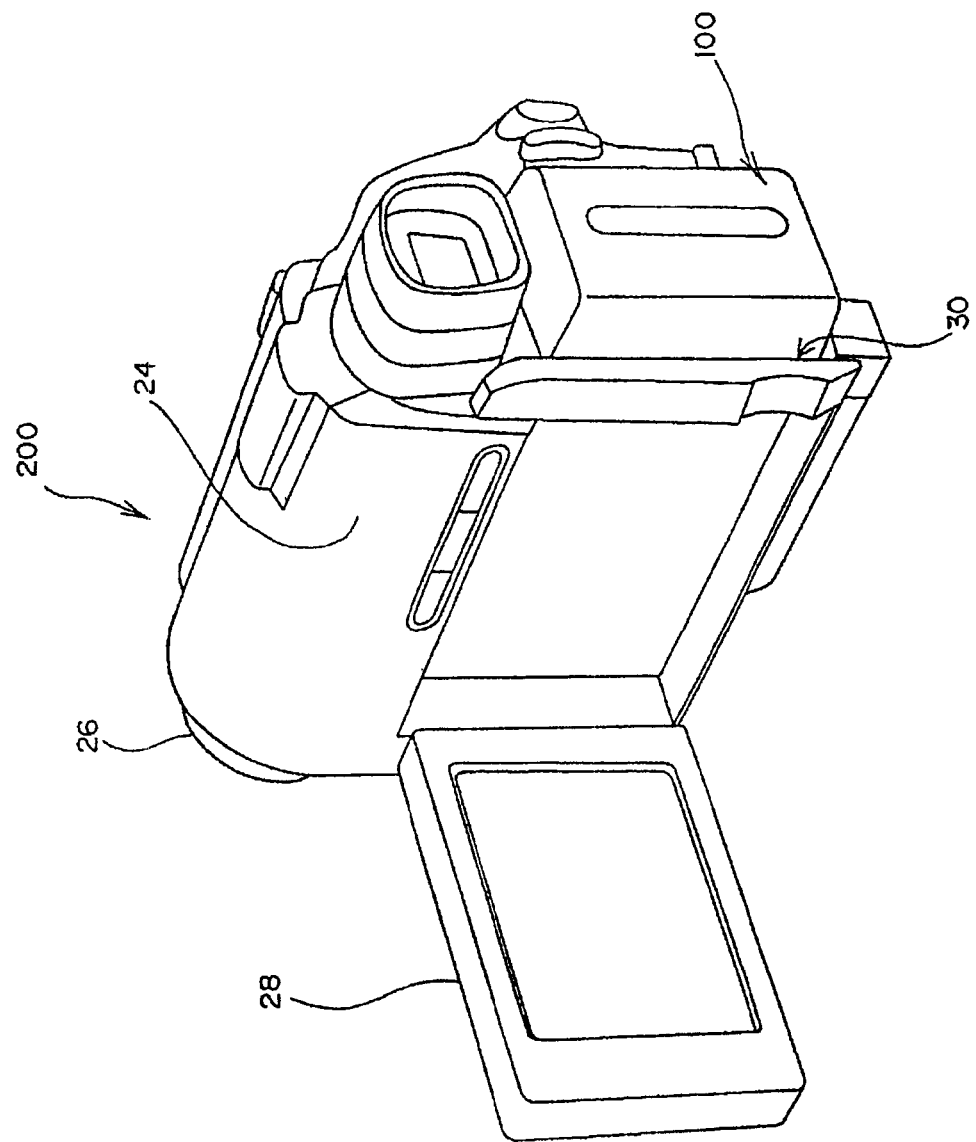
FIG. 9 is a perspective view of the imaging apparatus 200 with the battery apparatus 100 mounted thereon.

FIG. 7 is a perspective view of the imaging apparatus 200 to which the battery apparatus 100 is attached externally. FIG. 8 is an enlarged view of a battery mounting section of the imaging apparatus 200. FIG. 9 is a perspective view of the imaging apparatus 200 showing a state where the battery apparatus 100 is attached thereto.

As shown in FIG. 7, the imaging apparatus 200 includes a case 24, an optical system 26 incorporated into a front portion of the case 24, an imaging device (not shown) for imaging an image of a subject captured by the optical system 26, a liquid crystal display section 28 for displaying an image taken by the imaging device, a recording/reproducing section (not shown) for recording and/or reproducing an image taken by the imaging device in a record medium, and a battery apparatus 100 for supply power to the imaging device, the liquid crystal display section 28, and the recording/reproducing section.

A battery mounting section 30, on which the battery apparatus 100 is removably mounted, is disposed at a rear portion of the case 24.

The battery mounting section 30 has a flat mounting surface 3002, a plurality of engaging claws 3004 (3004A, 3004B and 3004C) disposed at the mounting surface 3002, a mounting section-side terminal 32 capable of having contact with the battery-side terminal 14, and an engaging convex portion 34 disposed at the mounting surface 3002.

The mounting surface 3002 has a width corresponding to the width of the bottom surface 1008 of the case 10 of the battery apparatus 100, and a length of a dimension greater than the length of the bottom surface 1008, and also has a side surface 3008 standing from the periphery of the mounting surface 3002.

The mounting section-side terminal 32 is disposed at an end portion on the opposite side of the optical system 26 in the length direction of the mounting surface 3002.

The engaging convex portion 34 is disposed at a portion on the opposite side of the mounting section-side terminal 32 in the longitudinal direction of the mounting surface 3002 to be able to protrude and retract with respect to the mounting surface 3002. The engaging convex portion 34 is normally biased in a direction in which it protrudes from the mounting surface 3002, and arranged to retract below the mounting surface 3002 by the operation of a lock release button which is not shown.

The engaging claws 3004 (3004A, 3004B and 3004C) are provided in the number corresponding to that of the engaging pieces 1012 of the battery apparatus 100, and are disposed three for each of the portions on both sides in the width direction of the mounting surface 3002 in the present embodiment to be formed to be engageable with the engaging pieces 1012 (1012A, 1012B and 1012C).

Figure 10:
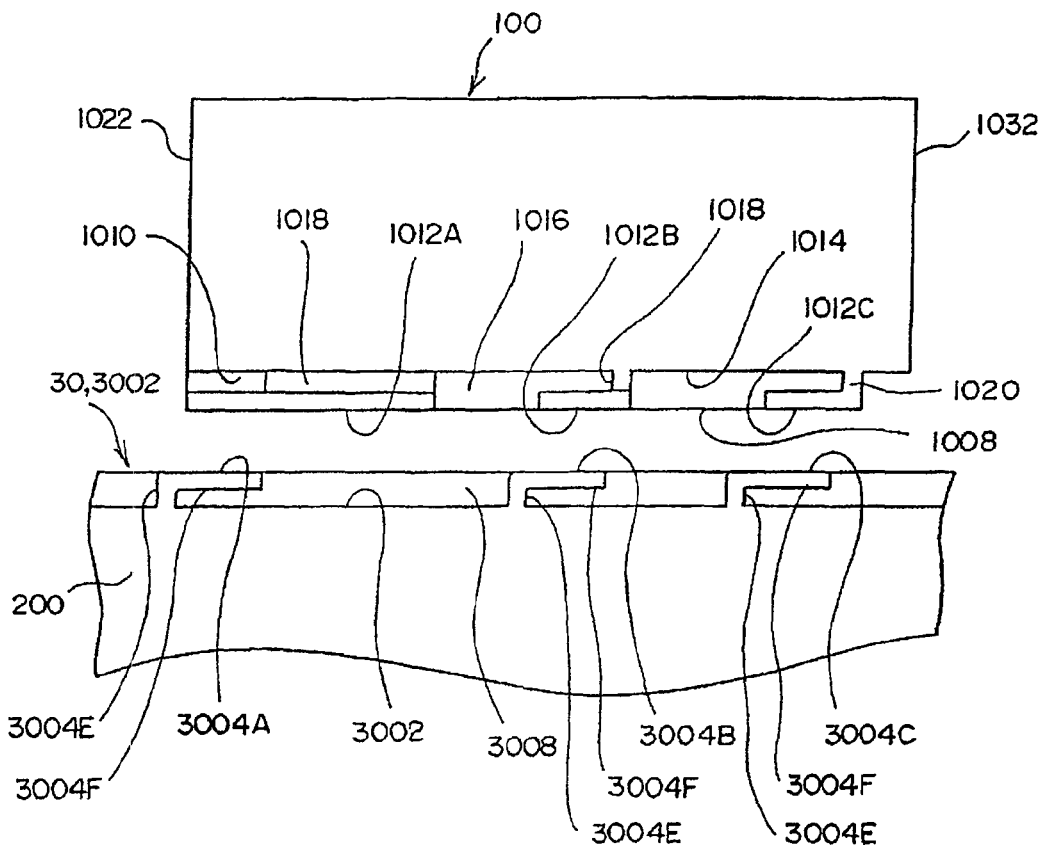
FIG. 10 is an explanatory view explaining the mounting of the battery apparatus 100 on the battery mounting section 30.

As shown in FIG. 10, the respective engaging claws 3004 (3004A, 3004B and 3004C) have a longitudinal wall 3004E standing from the mounting surface 3002, and a lateral wall 3004F projecting from a tip of the longitudinal wall 3004E so as to be parallel to the mounting surface 3002.

The two engaging claws 3004A and 3004C of the three engaging claws 3004 (3004A, 3004B and 3004C) are disposed at portions nearer the end portion in the length direction of the mounting surface 3002, and the remaining engaging claw 3004B is disposed at a portion close to the engaging claw 3004A disposed nearer the end portion of the mounting surface 3002, at which the mounting section-side terminal 32 is positioned.

The width direction W and the length direction L of the case 10 are matched with the width direction and the length direction of the mounting surface 3002, and the battery-side terminal 14 of the battery apparatus 100 is faced to the mounting section-side terminal 32 of the battery mounting section 30, and the bottom surface 1008 of the battery apparatus 100 is faced to the mounting surface 3002 of the battery mounting section 30. Then, the respective engaging pieces 1012 (1012A, 1012B and 1012C) of the battery apparatus 100 are positioned apart from one another with respect to the respective engaging claws 3004 (3004A, 3004B and 3004C) in the length direction L. In this state, the bottom surface 1008 of the battery apparatus 10 is made abut with the mounting surface 3002 of the battery mounting section 30, and the battery apparatus 100 is slid in the length direction of the case 10 and in the direction in which the battery-side terminal 14 approaches the mounting section-side terminal 32.

With this arrangement, the plurality of engaging claws 3004 is inserted into their respective corresponding recess portions 1010 and engaged with the engaging pieces 1012, and the bottom surface 1008 of the case 10 is mated with the mounting surface 3002, thereby restricting the movement of the battery apparatus 100 toward the mounting surface 3002. It is configured such that the engagement between the engaging claws 3004 and the engaging pieces 1012 restricts the movement of the battery apparatus 100 in the direction away from the mounting surface 3002. In this case, the engagement between the engaging claws 3004 and the engaging pieces 1012 may alternatively restrict both of the movement of the battery apparatus 100 toward the mounting surface 3002 and the movement in the direction away from the mounting surface 3002.

In the battery apparatus 100, with the engaging claws 3004 engaged to the engaging pieces 1012, the end surface 1022 on the battery-side terminal 14 side, which is one of the two end surfaces in the length direction L of the case 10, abuts the side surface 3008 of the battery mounting section 30, so that the engaging convex portion 34 is engaged to the cutout portion 1035 of the battery apparatus 100. This restricts the movement in the longitudinal direction of the case 10, thereby obtaining the mounting state of the battery apparatus 100 in the battery mounting section 30, so that the battery apparatus 100 is held.

In the present embodiment, under the engagement between the engaging claws 3004 and the engaging pieces 1012, the tips of the engaging claws 3004 come into contact with the tips of the convex portions 1018, thereby restricting the movement of the battery apparatus 100 in the width direction W. In this case, without making the tips of the engaging claws 3004 and the tips of the convex portions 1018 in contact, the movement of the battery apparatus 100 in the width direction W may alternatively be restricted by making other portions of the battery apparatus 100 and portions of the battery mounting section 30 in contact, such as between the side surfaces 1006 of the case 10 of the battery apparatus 100 and the portions of the battery mounting section 30.

Then, mounting the battery apparatus 100 on the battery mounting section 30 brings the battery-side terminal 14 of the battery apparatus 100 and the mounting section-side terminal 32 of the battery mounting section 30 in contact.

Figure 11:
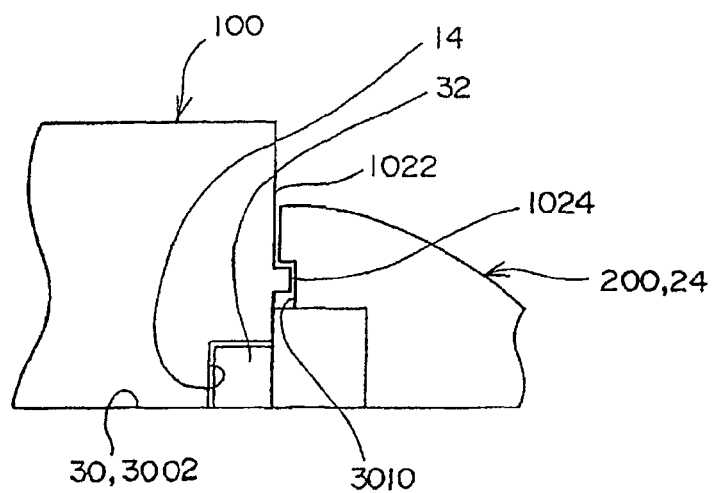
FIG. 11 is an explanatory view illustrating a state in which the battery apparatus 100 is mounted on the battery mounting section 30.

Upon the mounting of the battery apparatus 100 on the battery mounting section 30 as described above, there may leave a gap between the end surface 1022 of the battery-side terminal 14 side of the battery apparatus 100 and a portion of a case 24 (the side surface 3008 of the recess portion 3006) of the imaging apparatus 200 opposed to the end surface 1022, as shown in FIG. 11.

In this case, such a gap can be sealed with the convex portion 1024 by forming a recess groove 3010 in the side surface 3008 of the recess portion 3006 such that the convex portion 1024 of the battery apparatus 100 is inserted into the recess groove 3010. Accordingly, this is advantageous in reliably preventing, for example, a foreign matter having conductivity from entering through the above-mentioned gap portion and coming into contact with a connecting portion between the battery-side terminal 14 and the mounting section-side terminal 32.

Figure 12:
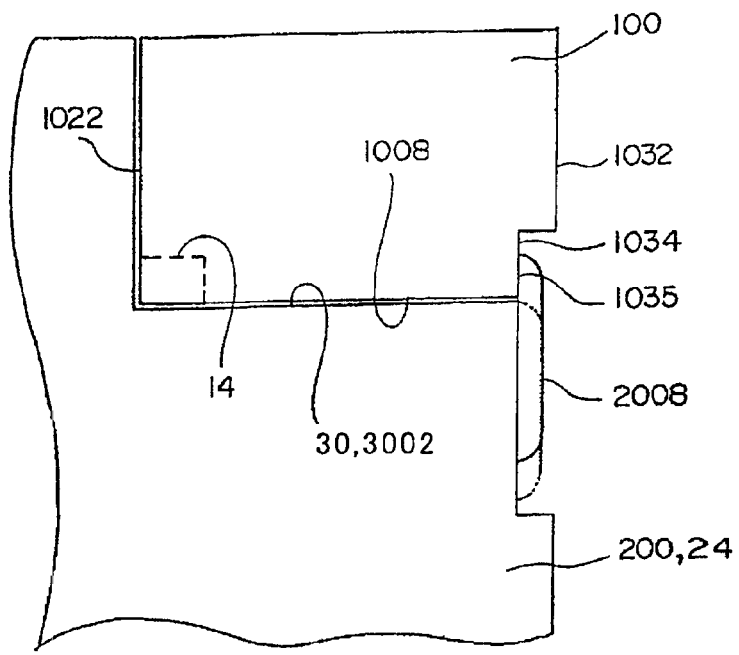
FIG. 12 is an explanatory view of a lock mechanism.

Alternatively, as shown in FIG. 12, the case 24 may be provided with a lock claw 2008 that is slid in a direction in which it connects and departs with respect to the cutout portion 1035 of the battery apparatus 100 being mounted on the battery mounting section 30, and is constantly biased in a direction in which it approaches the cutout portion 1035 by a biasing member such as a spring. Thus, it is also possible to arrange such that the engagement between the lock claw 2008 and the cutout portion 1035 prevents the battery apparatus 100 from coming off the battery mounting section 30, and the battery apparatus 100 can be removed from the battery mounting section 30 by releasing the engagement between the cutout portion 1035 of the battery apparatus 100 and the lock claw 2008.

In this case, the cutout portion 1035 of the battery apparatus 100 is displaced toward the inside of the battery apparatus 100 from the end surface 1032, and hence the lock claw 2008 can be disposed at a portion displaced toward the inside of the case 24 from the exterior of the case 24, thus enabling to construct the lock claw 2008 without causing it to project outwardly from the exterior of the case 24 of the imaging apparatus 200. Accordingly, it is advantageous in achieving miniaturization of the imaging apparatus 200 and also improving design characteristic.

In addition, in this case, since the portion at which the lock claw 2008 is engaged to the cutout portion 1035 is constantly biased in the direction in which it approaches the bottom surface 1008 of the battery apparatus 100, upon the slide of the bottom surface 1008 of the battery apparatus 100 along the mounting surface 3002 when mounting the battery apparatus 100 on the battery mounting section 30, or when removing the battery apparatus 100 from the battery mounting section 30, the tip of the lock claw 2008 projecting to the bottom surface 1008 abuts the surface of a label, such as the specification plate 1026 affixed to the bottom surface 1008, by the above-mentioned bias, and the printed portion of the surface of the specification plate 1026 etc. might be worn off and vanished by friction.

In this case, the lock claw 2008 may be arranged to abut the positioning convex portion 1030 at its tip. Thus, the tip of the lock claw 2008 abuts the positioning convex portion 1030, but does not abut the surface of the specification plate 1026. Therefore, the surface of the specification plate 1026 is unsusceptible to damage and dirt, and hence it is advantageous in protecting the printed portion of the surface of the specification plate 1026. In this case, the positioning convex portion 1030 may be flush with the surface of the specification plate 1026, or may be disposed so as to position at the outside of the case 10 away from the surface of the specification plate 1026.

Figure 13:
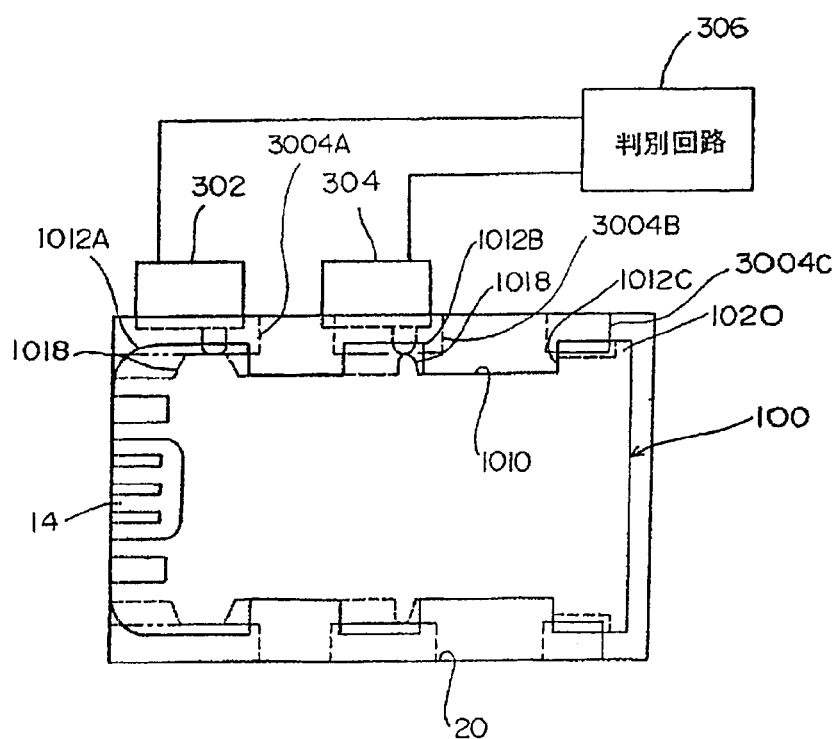
FIG. 13 is a block diagram illustrating a discriminating circuit of a convex portion 1018.

In another alternative, with the position of the end surface 1022 of the battery apparatus 100 as reference, it is possible to determine whether the battery apparatus 100 is a normal product or not, based on the positions of the respective convex portions 1018 disposed in the length direction L (or based on the presence and absence of the respective convex portions 1018 or the number of the convex portions 1018). For example, as shown in FIG. 13, sensors 302 and 304 are disposed at a battery housing room 20, each of which includes a microswitch for sensing the positions of the respective convex portions 1018 in the length direction L with the end surface 1022 of the battery apparatus 100 as reference. There is also disposed a discriminating circuit 30 for discriminating whether the respective convex portions 1018 are positioned correctly, on the basis of detecting signals from the respective sensors 302 and 304.

With this construction, on the basis of the discriminating result of the discriminating circuit 306, the power supply from the battery apparatus 100 can be permitted only in a case where the battery apparatus 100 is recognized as a normal product, and if not, the power supply from the battery apparatus 100 can be prohibited. This enables to prevent in advance the use of the battery apparatus 100 that is not a normal product.

In addition, the above-mentioned identification data of the battery apparatus 100 can be indicated by the positions of the respective convex portions 1018 disposed in the length direction L, or the presence and absence of the respective convex portions 1018, or the number of the convex portions 1018.

For example, in accordance with the construction shown in FIG. 9, four types of identification data can be indicated in a combination of ON and OFF of the two sensors 302 and 304. Needless to say, eight types of identification information are obtainable by disposing four sensors so as to detect the positions of a total of four convex portions 1018 disposed on both sides in the width direction of the case 10 of the battery apparatus 100.

Additionally, if a sensor that can measure the position of the respective convex portions 1018 in the length direction with the end surface 1022 as reference is used, it is of course possible to further increase the type of identification data detectable by the sensors.

In a case where the electronic equipment on which the battery apparatus 100 is mounted is a battery charger for giving a charge to the battery apparatus 100, one or more sensors similar to the above-mentioned sensors 302 and 304 may be disposed at the battery charger such that they sense the presence and absence of the mounting of the battery apparatus 100, and the charging operation to the battery apparatus 100 is started in response to this sensing operation.

Further, it is possible to determine characteristics features of the battery apparatus 100 (such as an appropriate charging current value, or as to whether quick charge is possible or not) on the battery charger side by sensing the positions of the convex portions 1018 with the above-mentioned sensors.

In addition, as shown in FIG. 1, it is arranged such that the surface of the specification plate 1026 is flush with the bottom surface 1008, or the surface of the specification plate 1026 is positioned at the inside of the case 10 from the bottom surface 1008, and also the positioning convex portion 1030 arranged flush with the bottom surface 1008 is inserted into the positioning groove 1027 of the specification plate 1026. Therefore, even if the bottom surface of the battery apparatus 100 and the mounting surface 3002 of the battery mounting section 30 are worn off by mounting and removing the battery apparatus 100 with respect to the battery mounting section 30, the surface of the specification plate 1026 is unsusceptible to damage and dirt, and hence it is advantageous in protecting the surface of the specification plate 1026.

Description will next be made of the effects of the present embodiment.

According to the battery apparatus 100 and the imaging apparatus 200 in the present embodiment, a total of six engaging pieces 1012 can be engaged to six engaging claws 3004 while mating the bottom surface 1008 of the case 10 of the battery apparatus 100 with the mounting surface 3002 of the battery mounting section 30, and then sliding the case 10 in the length direction L of the case 10.

This enables to reduce the dimension in the length direction L of the portion at which the engaging pieces 1012 and the engaging claws 3004 are engaged with each other, while reliably holding the battery apparatus 100 at the battery mounting section 30. It is therefore advantageous in reducing the slide stroke of the battery apparatus 100, and facilitating the mounting of the battery apparatus 100 onto the battery mounting section 30.

Figure 14:
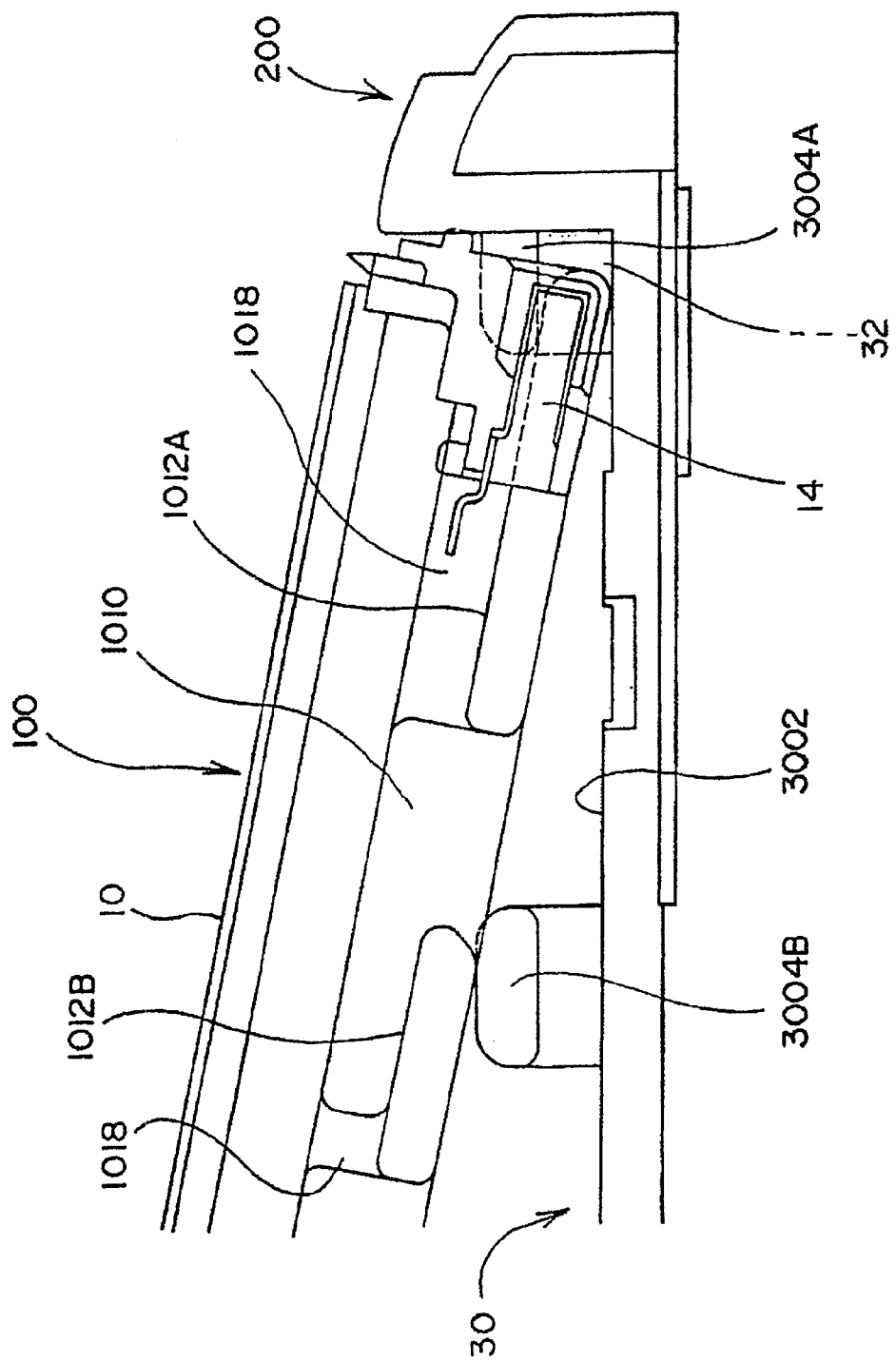
FIG. 14 is an explanatory view illustrating a state in which the battery apparatus 100 is mounted inclined on the battery mounting section 30.

Further, as shown in FIG. 14, when the battery apparatus 100 in its inclined state is mounted on the battery mounting section 30, although the engaging piece 1012A disposed nearer the end portion of the case 10, at which the battery-side terminal 14 is positioned, engages the engaging claw 3004A positioned nearer the mounting sections side terminal 32, the engaging piece 1012B disposed at the portion close to the engaging piece 1012A abuts the engaging claw 3004B and thereby to increase the angle of inclination between the battery apparatus 100 and the mounting surface 3002, that is, the angle between the bottom surface 1008 of the case 10 of the battery apparatus 100 and the mounting surface 3002 of the battery mounting section 30.

Accordingly, it is possible to immediately recognize that the mounting state of the battery apparatus 100 is incomplete, and hence it is advantageous in reliably mounting the battery apparatus 100.

In the present embodiment, the engaging piece 1012B is disposed close to the engaging claw 3004A positioned nearer the mounting section-side terminal 32. Therefore, when the mounting state of the battery apparatus 100 is incomplete, the inclination of the battery apparatus 100 to the mounting surface 3002 is increased to make it easier to recognize that the mounting state of the battery apparatus 100 is incomplete.

It is noted that if the angle of the battery apparatus 100 to the mounting surface 3002 is 10 degrees or more, the inclination of the battery apparatus 100 is recognizable immediately.

Further, referring to FIG. 10, the following effect can be introduced by the arrangement that the dimension in the length direction of the engaging claw 3004A nearer the mounting section-side terminal 32 of the engaging claws 3004 of the imaging apparatus 200 is set to be smaller than the dimension in the length direction of the remaining two engaging claws 3004B and 3004C.

Specifically, if the battery apparatus 100 is mounted incompletely to the battery mounting section 30, that is, in a case where the engaging piece 1012A disposed nearer the end portion of the case 10, at which the battery-side terminal 14 is positioned, engages the engaging claw 3004A positioned nearer the mounting section-side terminal 32, and the remaining two engaging pieces 1012B and 1012C do not engage the engaging claws 3004B and 3004C, the battery apparatus 100 is inclined in the direction in which it departs from the mounting surface 3002 by the self-weight of the battery apparatus 100. The angle of this inclination becomes remarkable as the dimension in the length direction of the engaging claw 3004A positioned nearer the mounting section-side terminal 32 is set to be smaller. Hence, as described above, the inclination of the battery apparatus 100 to the mounting surface 3002 in the case where the mounting state of the battery apparatus 100 is incomplete is increased so that it becomes easier to recognize that the mounting state of the battery apparatus 100 is incomplete.

Alternatively, the battery apparatus 100 of the present embodiment may be constructed as follows.

Specifically, the battery apparatus 100 has a case 10. The case 10 has two end surfaces 1022 and 1032 positioned at both ends in the length direction L of the case 10, and side surfaces 1006 for connecting the two end surfaces 1022 and 1032. A battery-side terminal 14 is disposed so as to face at least one selected from either of the end surface 1022 of the two end surfaces 1022 and 1032, and the side surfaces 1006 connected to the end surface 1022. An error insertion preventing groove including a plurality of recess portions 1010 and extending in the length direction L is formed in the side surface 1006. In a case of assuming that the side of the battery-side terminal 14 is the front in the length direction L, and the opposite direction is the back, the error insertion preventing groove is opened at a portion nearer the battery-side terminal 14 of both ends in the length direction L (the front end portion), and closed at the opposite side portion (the back end portion). Further, a convex portion 1018 swelling outwardly of the case 10 is formed at the error insertion preventing groove, or two or more convex portions 1018 are formed at spaced intervals in the length direction L.

With this construction, as described with reference to FIG. 13, the identification data of the battery apparatus 100 can be indicated by the position of the convex portions 1018 in the length direction L, or the presence and absence of the convex portions 1018, or the number of the convex portions 1018. In this case, since the convex portions 1018 swell outwardly of the case 10, they do not occupy the space within the case 10. This is advantageous in ensuring the space for housing parts in the inside of the case 10, or achieving miniaturization of the case 10, and also advantageous in improving the degree of freedom of the design of the battery apparatus 100.

Alternatively, in the battery apparatus 100 of the present embodiment, the error insertion preventing groove is disposed respectively at the portions on the two side surfaces 1006, which sandwich the case 10 therebetween in the width direction W and are opposed to each other. In this case, by having the two error insertion preventing grooves engaged to their respective corresponding projections, the position of the case 10 in the thickness direction H can be positioned to permit the error insertion preventing grooves to function as positioning grooves.

With this construction, in a case of providing a battery housing room that houses the battery apparatus 100 by having it inserted in the length direction L, a battery apparatus having a different dimension in the thickness direction H can be positioned and housed within the battery housing room by disposing the respective projections within the battery housing room and having the two error insertion preventing grooves engaged to the respective projections.

Alternatively, in the battery apparatus 100 of the present embodiment, a plurality of recess portions 1010 are formed by a plurality of engaging pieces 1012 (1012A, 1012B and 1012C), portions of the side surfaces 1016 that face these engaging pieces 1012 (1012A, 1012B and 1012C), respectively, and portions of planes 1014 that face these engaging pieces 1012 (1012A, 1012B and 1012C), respectively. These recess portions 1010 can constitute the above-mentioned error insertion preventing grooves.

Alternatively, in the battery apparatus 100 of the present embodiment, there are disposed convex portions 1018 connecting to the plurality of engaging pieces 1012 (1012A, 1012B and 1012C), respectively. The portions at which the respective convex portions 1018 are respectively connected to the engaging pieces 1012 (1012A, 1012B and 10120) are portions nearer the direction in which the battery apparatus 100 is moved (slid) when mounting the battery apparatus 100 on the battery mounting section 30 (i.e., the portions nearer the battery-side terminal).

With this construction, when the respective engaging pieces 1012 (1012A, 1012B and 1012C) are engaged to and removed from the engaging claws 3004 (3004A, 3004B and 30040), a distance in the length direction L is ensured respectively between the engaging piece 1012A and the engaging claw 3004A, between the engaging piece 1012B and the engaging claw 3004B, and between the engaging piece 1012C and the engaging claw 3004C. Accordingly, when the respective engaging pieces 1012 (1012A, 1012B and 1012C) are engaged to and removed from the engaging claws 3004 (3004A, 3004B and 3004C), interference between the respective engaging claws 3004 and the respective convex portions 1018 is hardly caused, and hence it is advantageous in executing smooth mounting and removal of the battery apparatus 100.

While in the present embodiment the imaging apparatus is illustrated as electronic equipment, the present invention is of course applicable to a battery charger for charging a battery apparatus, and a variety of the electronic equipment operable with a battery apparatus.

INDUSTRIAL APPLICABILITY

According to the battery apparatus and the electronic equipment of the present invention, the three or more engaging pieces of the battery apparatus are engaged to the engaging claws of the battery mounting section while mating the bottom surface of the case of the battery apparatus with the mounting surface of the battery mounting section and then sliding the case in the length direction of the case. It is therefore possible to reduce the dimension in the length direction of the portions at which the engaging pieces and the engaging claws are engaged to each other, while maintaining reliably the mounting state of the battery apparatus. This is advantageous in reducing the slide stroke of the battery apparatus and improving the operability of mounting and removal of the battery apparatus with respect to the battery mounting section.

In addition, since the three or more of the engaging pieces and the engaging claws are disposed at spaced intervals in the length direction of the case, if the battery apparatus is mounted obliquely on the battery mounting section, the battery apparatus is inclined greatly to the battery mounting section, and hence user can recognize immediately that the mounting is incomplete. This is advantageous in reliably mounting the battery apparatus on the battery mounting section.

The invention claimed is:

1. A battery comprising:
a case having a width, a thickness, and a length;
a battery cell housed in an inside of the case;
a battery-side terminal disposed on a side surface at one end of the case in a length direction and electrically connected to the battery cell;
an engaging piece disposed at the one end of the case at which the battery-side terminal is positioned such that the engaging piece extends from an upper portion of the one end of the case in a length direction a same distance away from the one end of the case as a lower portion of the case at the one end extends in the length direction such that an edge of the engaging piece at the one end of the case in the length direction is even with an edge of the lower portion of the case in the length direction at the one end of the case, the engaging piece also located at an edge of the case in a width direction; and
a second engaging piece disposed at the one end of the case at which the battery-side terminal is positioned such that the second engaging piece extends from the upper portion of the one end of the case in the length direction the same distance away from the one end of the case as a lower portion of the case at the one end extends in the length direction such that an edge of the second engaging piece in the length direction at the one end of the case is even with the edge of the case in the length direction at the one end of the case, the second engaging piece located at an edge of the case in the width direction on an opposite side of the case in the width direction from the engaging piece.

2. The battery as claimed in claim 1, further comprising:
a convex portion located between and connected to the case and the engaging piece, the convex portion extending in the width direction a distance less than a distance the engaging piece extends in the width direction.

3. The battery as claimed in claim 1, further comprising:
a second convex portion located between and connected to the case and the second engaging piece, the second convex portion extending in the width direction a distance less than a distance the second engaging piece extends in the width direction.

4. A battery comprising:
a case having a width, a thickness, and a length;
a battery cell housed in an inside of the case;
a battery-side terminal disposed on a side surface at one end of the case in a length direction and electrically connected to the battery cell;
an engaging piece disposed at the one end of the case at which the battery-side terminal is positioned such that the engaging piece extends from an upper portion of the one end of the case in a length direction a same distance away from the one end of the case as a lower portion of the case at the one end extends in the length direction such that an edge of the engaging piece at the one end of the case in the length direction is even with an edge of the lower portion of the case in the length direction at the one end of the case, the engaging piece also located at an edge of the case in a width direction; and
a convex terminal side portion projecting in the length direction from the one end surface of the case and extending in the width direction along the one end surface of the case, the convex terminal side portion disposed at a distance in the thickness direction from the battery-side terminal, the convex terminal side portion being located on the one end of the case, and the convex terminal side portion projecting in the length direction away from an outermost end surface of the case a distance greater than a distance any other portion of the battery extends in the length direction.

5. The battery as claimed in claim 1, wherein a recess portion is formed between the engaging piece and the battery-side terminal, the recess portion being open at the end of the case in the length direction.

6. The battery as claimed in claim 1, wherein the battery-side terminal is located between the first engaging piece and the second engaging piece.

* * * * *